US012275624B2

(12) United States Patent
Gneckow, Jr.

(10) Patent No.: US 12,275,624 B2
(45) Date of Patent: Apr. 15, 2025

(54) CARPET PULLING APPARATUS AND SYSTEM FOR REMOVING CARPET

(71) Applicant: Elwood Louis Gneckow, Jr., Royal Oak, MI (US)

(72) Inventor: Elwood Louis Gneckow, Jr., Royal Oak, MI (US)

( * ) Notice: Subject to any disclaimer, the term of this patent is extended or adjusted under 35 U.S.C. 154(b) by 630 days.

(21) Appl. No.: 17/341,796

(22) Filed: Jun. 8, 2021

(65) Prior Publication Data

US 2021/0293041 A1 Sep. 23, 2021

Related U.S. Application Data

(63) Continuation-in-part of application No. 17/234,219, filed on Apr. 19, 2021.

(51) Int. Cl.
*B66D 1/60* (2006.01)
*E04G 23/00* (2006.01)

(52) U.S. Cl.
CPC ............. *B66D 1/60* (2013.01); *E04G 23/006* (2013.01)

(58) Field of Classification Search
CPC . E04G 23/006; B32B 43/006; B32B 2419/00; B66D 1/12; B66D 1/28; B66D 1/60; Y10T 156/1168; Y10T 156/1978; Y10S 156/929; Y10S 156/94
See application file for complete search history.

(56) References Cited

U.S. PATENT DOCUMENTS 5,456,794 A * 10/1995 Barrett ............... A47G 27/0487 156/763
7,032,886 B1 * 4/2006 Kraft ..................... E04G 23/006 254/210
2006/0180799 A1 * 8/2006 Rannikko ............. E04G 23/006 254/202
2015/0329335 A1 * 11/2015 Azzarelli ............... B66D 3/006 254/323
2018/0334820 A1 * 11/2018 Gneckow, Jr. ........... B66D 1/60

* cited by examiner

*Primary Examiner* — George R Koch
(74) *Attorney, Agent, or Firm* — Jacob M. Ward; Ward Law Office LLC

(57) ABSTRACT

A carpet pulling apparatus and system are disclosed. The apparatus comprises a base plate with a first surface and a second surface. The apparatus comprises a trolley detachably coupled with the base plate, and the trolley comprises a platform having one pair of vertical flanges, one pair of frames detachably coupled with the platform, and one pair of links coupled with the pair of vertical flanges at a first end, and with the pair of frames at a second end. The apparatus further comprises a spring-controlled lever detachably mounted to a main handle and the spring-controlled lever is configured to detach the base plate from the platform. Further, the apparatus includes a remote-controlled winch disposed over the platform, and a cable extending from a first end to a second end, the first end being received by the remote-controlled winch.

21 Claims, 10 Drawing Sheets

CARPET PULLING APPARATUS AND SYSTEM FOR REMOVING CARPET

CROSS-REFERENCE TO RELATED PATENT APPLICATION

This application is a continuation-in-part of U.S. application Ser. No. 17/234,219 filed on Apr. 19, 2021, titled "A Carpet Cutting Apparatus and A Method and System for Removing Carpet Bonded To A Floor" currently pending. The above identified application is incorporated herein by reference in its entirety.

TECHNICAL FIELD

The present invention generally relates to apparatus for the removal of carpeting from a floor, and more particularly, relates to a carpet pulling apparatus, and system for removing carpet from the floor.

BACKGROUND

In recent times, the installation of carpeting on the floors of homes, office or commercial buildings such as airport, theatres and the like, usually require bonding to the floor. However, it is a difficult task to remove the carpet from the floor when it becomes necessary either due wear and tear, or to replace the carpet with another one. Further, in commercial spaces large size carpet are installed and due to various pillars or other obstructions, removing the big size carpet become difficult task. Further, a variety of carpet pulling apparatus are available, however these available apparatuses involve complete manual operation for cutting and/or pulling the carpet from the floor. Further, a few examples of these carpet pulling apparatuses are mentioned below.

Prior art, for various aspects contained there within, relevant to this disclosure includes, U.S. Pat. No. 10,132,094 to Elwood. However, the carpet pulling apparatus provides manual removal of carpet.

In reference to '094 that describes a carpet pulling apparatus including a base including a top surface and a bottom surface opposite the top surface. The bottom surface includes a plurality of spikes. A winch is attached to the top surface of the base. A cable extends from a first end to a second end. The first end is received by the winch. A clamp is attached to the second end of the cable. A diverter is configured to receive the cable at a location between the first end and the second end and divert a direction of extension of the cable. The diverter is capable of being moved relative to the base. However, the Elwood fails to disclose a carpet pulling apparatus that can be remotely controlled. Further the patent does not provide system for an automatic or remotely cutting a large size carpet into a predetermined size of stripes so that easier removal of carpet. Further, Elwood fails to provide simultaneous cutting of carpet stripes by means of carpet cutting apparatus and removal of strips by means of winch and clamps.

In reference to Ser. No. 17/234,219, which describes carpet cutting and pulling system utilizing a carpet pulling apparatus. However, the carpet pulling apparatus does not disclose automatic control of the carpet pulling apparatus or remotely controlling of winch of the carpet pulling apparatus.

Therefore, in light of above-mentioned examples, there is a need to develop an automatic carpet pulling apparatus and a carpet removing system which can employ an automatic mechanism of carpet removing. To overcome the above-mentioned shortcoming, an improved carpet pulling apparatus and a system for removing carpet from the floor with minimal user interference, is disclosed.

SUMMARY OF THE INVENTION

In accordance with a preferred embodiment of the invention, the present objective of the invention is to provide a carpet pulling apparatus. The carpet pulling apparatus mainly includes a base plate with a first surface and a second surface. The first surface comprises at least one pair of holes, and the second surface comprises a plurality of first slanted spikes arranged in on a plurality of strips. A trolley is detachably coupled with the base plate. The trolley comprises a platform having at least one pair of vertical flanges disposed on either side of the platform, at least one pair of frames detachably coupled with the platform through a plurality of levers, and at least one pair of links coupled with the pair of vertical flanges at a first end, and with the pair of frames at a second end. A plurality of wheels is coupled to the at least one pair of frames through the plurality of levers. A spring-controlled lever is detachably mounted to a main handle at an upper end, and to the at least one pair of links at a lower end. The spring-controlled lever is configured to detach the base plate from the platform. A remote-controlled winch enclosed in a housing disposed over the platform. The remote-controlled winch comprises a cable extending from a first end to a second end, the first end being received by the remote-controlled winch.

In one embodiment of the present invention, the spring-controlled lever mainly includes at least two vertical cords coupled with each other through a horizontal handle, the horizontal handle being detachably mounted to the main handle. At least two springs are coupled to the at least two vertical cords at a first side, and to at least two metal strips at a second side, the at least two metal strips being coupled with the at least one pair of links. The spring-controlled lever is configured to detach the base plate from the by lifting the horizontal handle upwards, which pushes the plurality of second slanted spikes, facing the plurality of first slanted spikes, downwards through the at least one pair of links.

In one alternate embodiment, the shield comprises a main body having at least two grooved channels disposed on at least both sides of the main body, a plurality of pockets coupled with the main body using a plurality of screws, and a plurality of holders coupled with the main body above each of the plurality of pocket. The at least two grooved channels of the main body are configured to be coupled with the at least one pair of vertical sections of the main handle, wherein the plurality of pockets and holders are configured to receive a plurality of carpet pulling clamps.

In another alternate embodiment, the vertical flange comprises a rectangular base section, and a circular top section, and disposed over at least first side end of the platform. A first hole disposed on the circular top section to receive the first end of first link from the at least one pair of links, and a plurality of grooves integrated over the circular top section. The rectangular base section is configured to receive the main handle, and the plurality of grooves are configured to receive the at least one pair of vertical sections of the main handle.

In one preferred embodiment, carpet removing system is disclosed. The system mainly includes a base plate having a first surface with a plurality of holes, a first plurality of clamping hooks, and a second surface with a plurality of first slanted spikes arranged in a plurality of first strips. A trolley is detachably coupled with the base plate. The trolley comprises a platform having a top surface and a bottom surface. The top surface is provided with at least one pair of vertical flanges disposed on either side of the platform. At least one pair of frames are detachably coupled with the top surface of the platform through a plurality of levers. At least one pair of links are coupled with the pair of vertical flanges at a first end, and with the pair of frames at a second end. The bottom surface having a plurality of second slanted spikes arranged on a plurality of second strips, and configured to receive the plurality of first slanted spikes. A plurality of wheels is coupled to the at least one pair of frames through the plurality of levers. A housing is disposed over the platform, to enclose a remote-controlled winch, and a cable extending from a first end to a second end, the first end being received by the remote-controlled winch. A main handle is provided and is having a pair of vertical sections, and at least one horizontal top section, and detachably coupled to the at least one pair of vertical flanges of the platform, through a spring-controlled lever coupled with the main handle. The main handle comprising a shield disposed within the at least one pair of vertical sections of the main handle, and a remote controller disposed over the at least one horizontal top section of the main handle. The spring-controlled lever is configured to be lifted upwards, and the main handle is inclined downwards along the at least one pair of vertical flanges, to detach the base plate from the platform, and the main handle is thereby lifted from the platform in order to attach with the first surface of the base plate.

To further clarify advantages and features of the present invention, a more particular description of the invention will be rendered by reference to specific 15 embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1A:
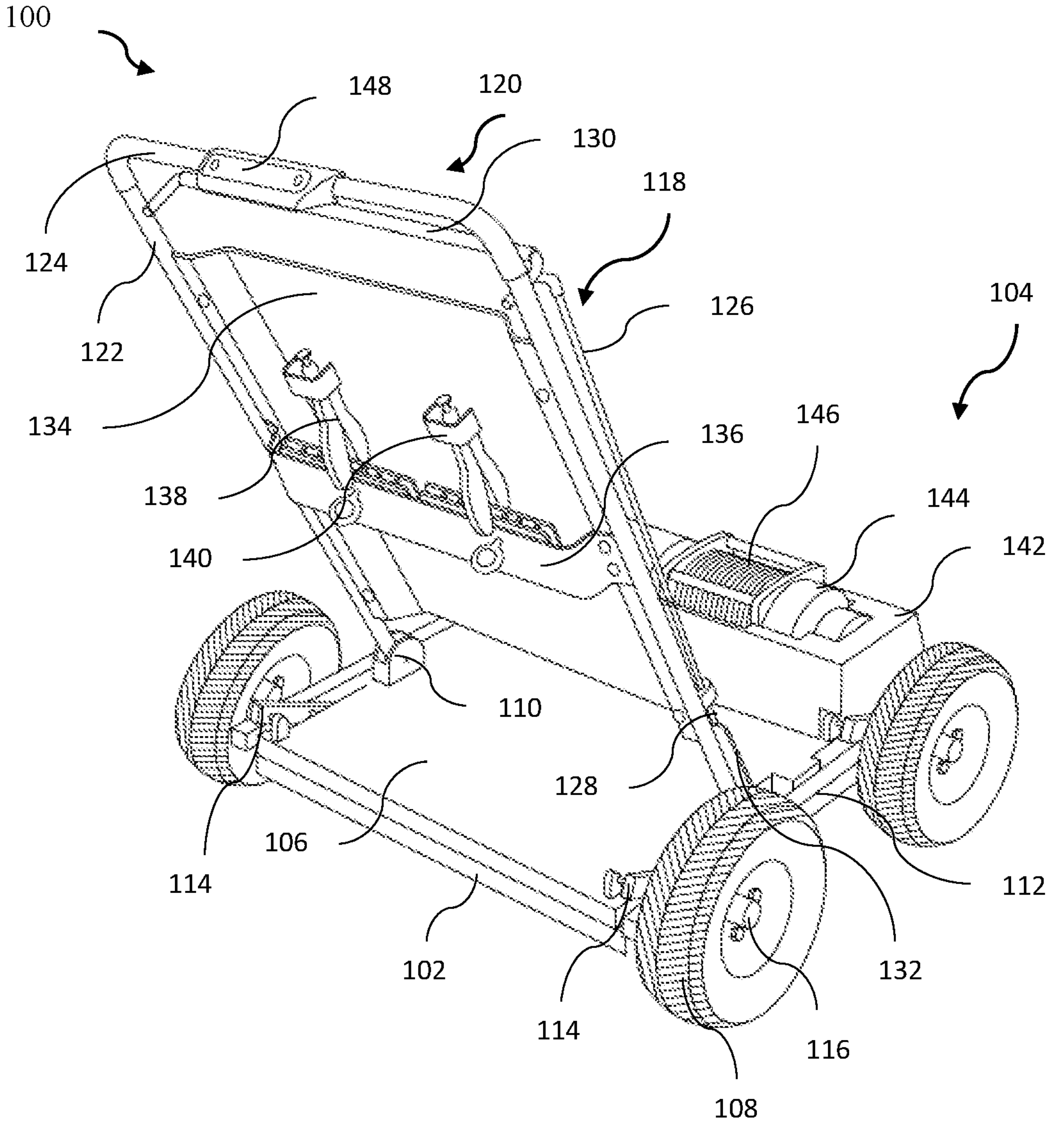
FIG. 1A illustrates an isometric view of the carpet pulling apparatus, according to a preferred embodiment of the invention.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

Figure 1B:
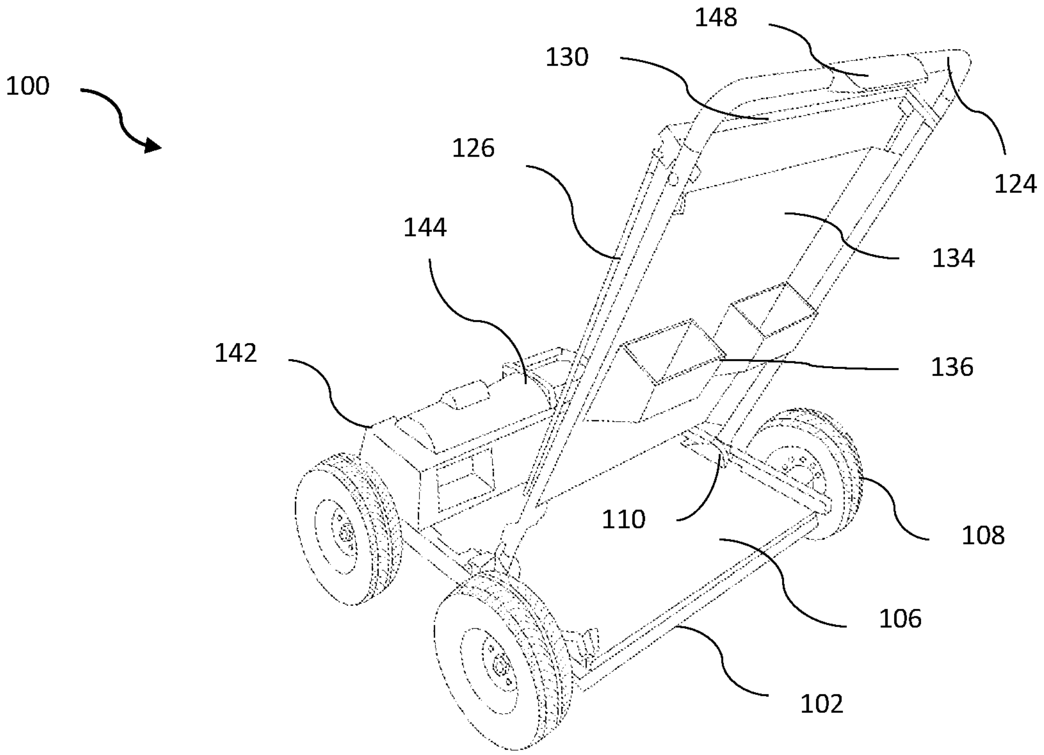
FIG. 1B illustrates another isometric view of the carpet pulling apparatus, according to a preferred embodiment of the invention.
Figure 1C:
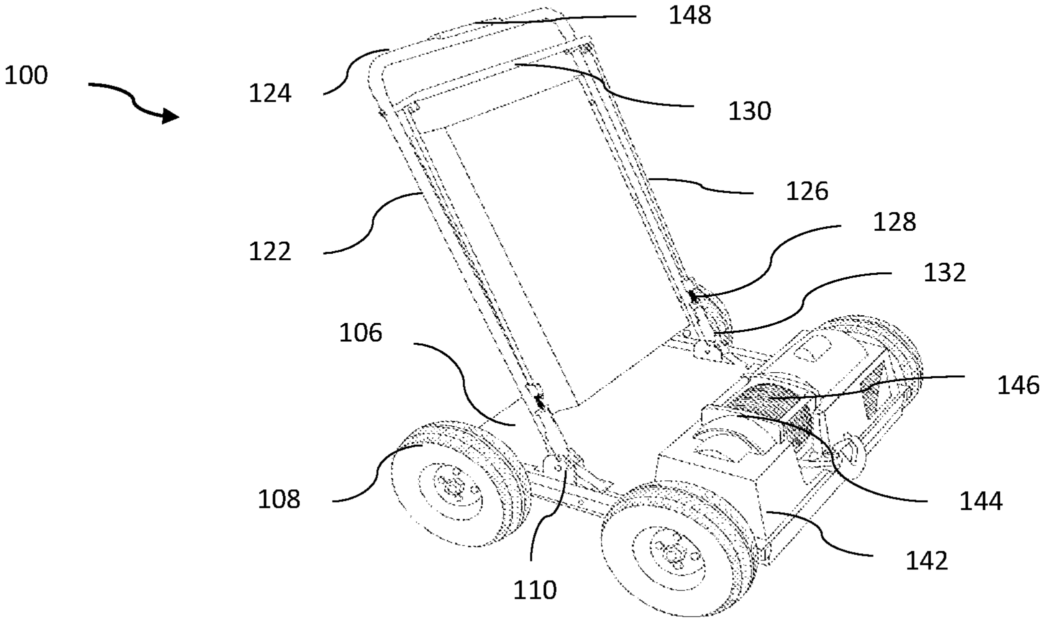
FIG. 1C illustrates another isometric view of the carpet pulling apparatus, according to a preferred embodiment of the invention.

FIG. 1A illustrates an isometric view of the carpet pulling apparatus 100, in conjunction with FIG. 1B, and FIG. 1C according to a preferred embodiment of the invention. The carpet pulling apparatus 100 may be employed for pulling off a carpet glued to a floor. Further, the carpet pulling apparatus 100 may be employed for cutting off the carpet glued to the floor. In an embodiment, the carpet pulling apparatus 100 may be employed at commercial and residential spaces, for removing the carpet from the floor. In one exemplary embodiment, the carpet pulling apparatus 100 may be fully automatic without any manual operation. In another embodiment, the carpet pulling apparatus 100 may be semi-automatic, involving minimal manual operations.

As shown in FIG. 1A-C, the carpet pulling apparatus 100 may be explained in conjunction with FIG. 2A to FIG. 2H, according to one embodiment of the present invention. The carpet pulling apparatus 100 may comprise a base plate 102 having a first surface and a second surface. Further, the first surface may be provided with a first plurality of holes, and the second surface may be provided with a first plurality of spikes. In an embodiment, the first surface of the base plate 102 may be provided with at least two holes integrated over one end of the first surface. In another embodiment, the second surface of the base plate may be provided with a first plurality of slanted spikes arranged over a first plurality of strips. Further, the carpet pulling apparatus 100 may comprise a trolley 104 coupled with the base plate 102. Further, the base plate 102 may be detachably coupled to the trolley 104. Further, the trolley 104 may comprise a platform 106, and a plurality of wheels 108. In an embodiment, the platform 106 may comprise a plurality of vertical flanges 110 integrated on at least two sides of the platform 106. In an embodiment, the platform 106 may comprise a first surface and a second surface, the second surface may include a second plurality of slanted spikes arranged on a second plurality of strips. In one embodiment, the platform 106 may include at least two vertical flanges 110 integrated on at least two sides of the platform 106. Further, the trolley 104 may comprise a plurality of frames 112 coupled to the platform 106 using a plurality of levers 114. In one embodiment, each frame of the plurality of frames 112 may be detachable from the platform 106. In an embodiment, the plurality of wheels 108 are coupled to the platform 106 using a plurality of shafts 116. In one embodiment, each frame 112 of the plurality of frames 112 may be provided with a plurality of holes. Further, each hole may be integrated along a length of the frame 112 in a longitudinal direction. In one embodiment, at least one hole of the frame 112 may be configured to receive at least one shaft 116 on one side and at least one lever 114 on other side. Further, the platform 106 may be provided with a plurality of links (not shown) configured to be coupled at one end with the plurality of the vertical flanges 110, and at another end with the plurality of holes of the frame 112.

As shown in FIG. 1A-C, the carpet pulling apparatus 100 may further comprise a spring-controlled lever 118 coupled to a main handle 120 at a first end, and at a second end to the plurality of links. In an embodiment, the spring-controlled lever 118 may be configured to detach the base plate 102 from the platform 106. In another embodiment, the spring-controlled lever 118 may be configured to detach the main handle 120 from the vertical flanges 110 of the platform 106. In another embodiment, the main handle 120 may be detachably coupled to the trolley 104. In one embodiment, the main handle 120 may comprise at least two vertical sections 122 and at least one horizontal top section 124. In one embodiment, the at least two vertical sections 122 may be coupled with at least two vertical flanges 110. In another embodiment, the vertical sections 122 of the handle may be detachably coupled to the vertical flanges 110 using the spring-controlled level 118.

Further, as shown in FIG. 1A-1C, the spring-controlled lever may comprise at least one cord 126 coupled to at least one spring 128 at one end; and coupled to a horizontal handle 130 at another end. Further, the at least one spring 128 may be coupled to at least one metal strip 132 at another end. Further, the at least one metal strip 132 may be coupled to at least one link at a lower end. In an embodiment, the horizontal handle 130 may be configured to be lifted upwards from the main handle 120, so that the cord 126 creates a tension in the at least one spring 128, and the spring tension pulls the at least one metal strip 132 upwards, which thereby pushes the at least one link downwards. Further, the downward motion of the at least one link pushes the second plurality of slanted spikes of the platform 106. Further, the second plurality of slanted spikes may lift the first plurality of slanted spikes of the base plate 102, and thereby facilitating detachment of the base plate 102 from the trolley.

Further, the carpet removing apparatus 100 may further comprise a shield 134 coupled between the at least two vertical sections 122 of the main handle 120. In one embodiment, the shield 134 may be detachable coupled between the at least two vertical sections 122. Further, the carpet pulling apparatus 100 may further comprise at least one pocket 136 coupled to the shield 134. In one embodiment, the carpet pulling apparatus 100 may comprise a plurality of pockets coupled to the shield 134. In one exemplary embodiment, at least one pocket 136 may be provided for storing a plurality of carpet pulling clamps 138 or carpet cutters or alike. Further, the shield 134 may further comprise a plurality of clamp holders 140. Further, the plurality of clamp holders

140 may be coupled at one side of the shield 134. In one embodiment, the plurality clamp holders 140 may be provided to hold the carpet pulling clamps 138 into the plurality of pockets 136.

As shown in FIG. 1A-C, the carpet pulling apparatus 100 may further comprise a winch housing 142 coupled over the platform 106. In one embodiment, the winch housing 142 may be configured for enclosing a remote-controlled winch 144. Further, the remote-controlled winch 144 may comprise at least one cable 146. In one embodiment, the at least one cable 146 may have a first end and a second end. Further, the first end of the at least one cable 146 may be received or coupled with the remote-controlled winch 144.

Referring to FIG. 1A-1C, the carpet pulling apparatus 100 may further comprise a remote controller 148 coupled with the horizontal top section 124 of the main handle 120. Further, the remote controller 148 may be configured to operate the remote-controlled winch 144.

Figure 2A:
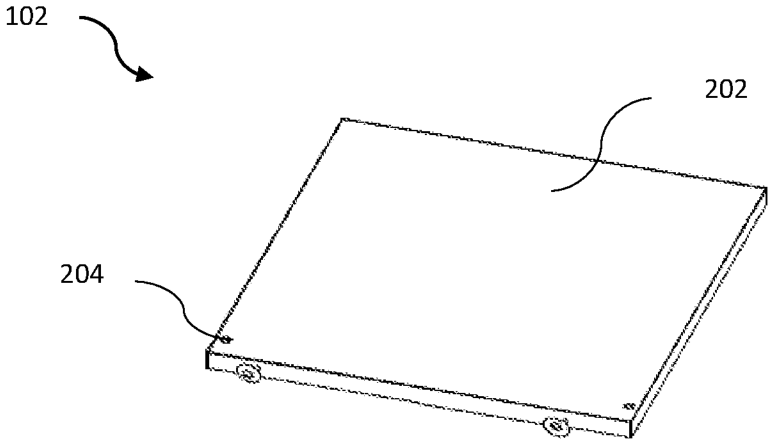
FIG. 2A illustrates a perspective of a base plate of the carpet pulling apparatus, according to a preferred embodiment of the invention.
Figure 7:
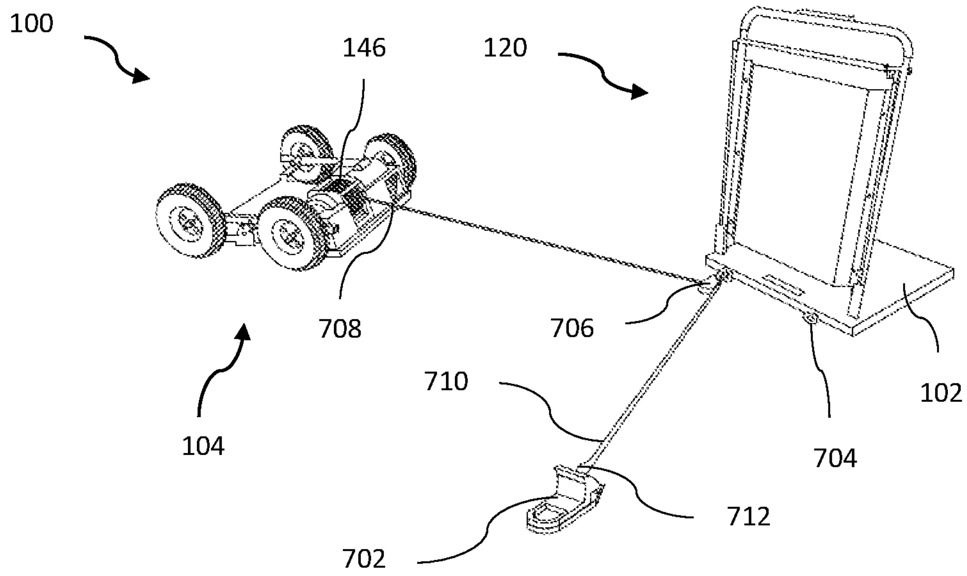
FIG. 7 illustrates a system of carpet removal showing a carpet pulling apparatus coupled with a carpet cutter, according to a preferred embodiment of the invention.

Referring to FIG. 2A which illustrates a perspective of the base plate 102 of the carpet pulling apparatus 100, in conjunction with FIG. 1A-C, according to a preferred embodiment of the invention. The base plate 102 may be provided the first surface 202 with a first plurality of holes 204 integrated at one side of the first surface 202 of the base plate 102. In an embodiment, the plurality of holes 204 may be disposed on the first surface 202 of the base plate 102. In one embodiment, the first surface may be referred as a top surface. Further, the first plurality of holes 204 may be provided to receive the two vertical sections 122 of the main handle 120. Further, the base plate 102 may comprise the second surface with the plurality of slanted spikes. In an embodiment, the base plate 102 may comprise a first plurality of clamping hooks 704 (as shown in FIG. 7). Further, the first plurality of clamping hooks may be coupled on a side of the base plate 102. In one embodiment, the first plurality of clamping hooks may be configured to receive a plurality of pullies for diverting the at least one cable 146 from the remote-controlled winch 144 towards the carpet pulling clamp 138.

Figure 2B:
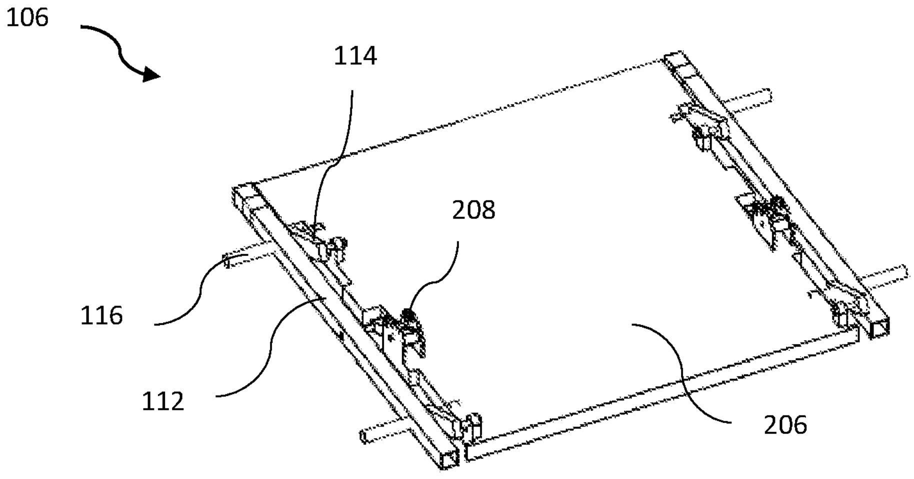
FIG. 2B illustrates a perspective of a platform, coupled with frames, of the carpet pulling apparatus, according to a preferred embodiment of the invention.

Referring to FIG. 2B illustrates a perspective of the platform 106, coupled with the plurality of frames 112, of the carpet pulling apparatus 100, in conjunction with FIG. 1A-C, according to a preferred embodiment of the invention. The platform 106 may comprise the top surface 206 and the bottom surface (not shown). Further, the second surface may be provided with the second plurality of slanted spikes arranged on the second plurality of strips. In one embodiment, the platform 106 may include at least two vertical flanges 110 integrated on at least two sides of the platform 106. Further, the platform 106 may comprise the plurality of frames 112 coupled to the platform 106 using the plurality of levers 114. In one embodiment, each frame of the plurality of frames 112 may be detachable from the platform 106. In one exemplary embodiment, the plurality of wheels 108 are coupled to the platform 106 using the plurality of shafts 116. In one embodiment, each frame 112 of the plurality of frames 112 may be provided with a plurality of holes. Further, each hole may be integrated along a length of the frame 112 in a longitudinal direction. In one embodiment, at least one hole of the frame 112 may be configured to receive at least one shaft 116 on one side and at least one lever 114 on other side. Further, the platform 106 may be provided with the plurality of links 208 configured to be coupled at one end with the plurality of the vertical flanges 110, and at another end with the plurality of holes of the frame 112. In an embodiment, the plurality of links 208 may be coupled with the second plurality of slanted spikes of the bottom surface of the platform 106.

Figure 2C:
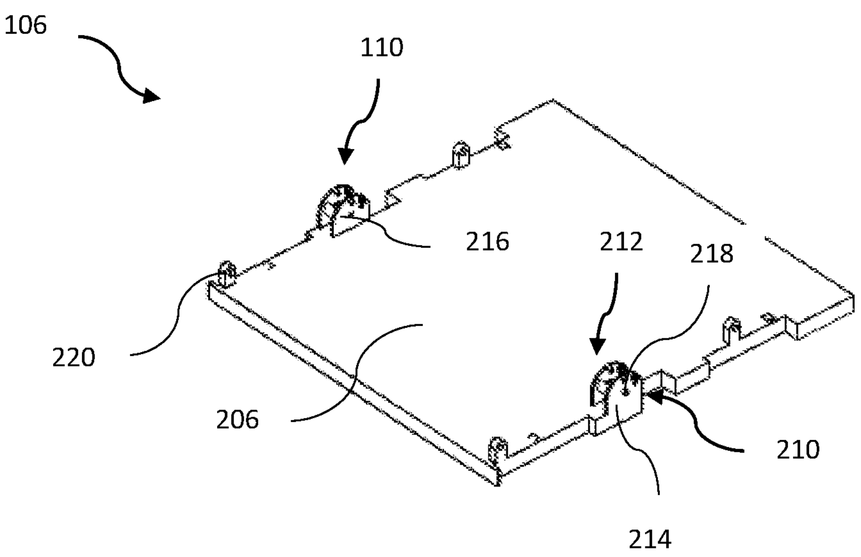
FIG. 2C illustrates a perspective of a platform depicting vertical flanges, of the carpet pulling apparatus, according to a preferred embodiment of the invention.

Referring to FIG. 2C which illustrates a perspective of the platform 106 showing the plurality of vertical flanges 110, of the carpet pulling apparatus 100, in conjunction with FIG. 1A-C, according to a preferred embodiment of the invention. The platform 106 may be integrated with the plurality of vertical flanges 110 on at least one side of the platform 106. Further, the plurality of vertical flanges 110 may be provided in pairs, with a first flange 210 and a second flange 212. Further, the first flange 210 and the second flange 212 may be identical in shape. In one embodiment, the first flange 210 may comprises a rectangular base section 214, and a circular top section 216. Further, the first flange 210 may be integrated over at least first side end of the platform 106. In an embodiment, the circular top section 216 of the first flange 210 may be provided with a first bus connector 218 or a first protruded section, to receive a first end of first link from the plurality of links 208. Further, the second flange 212 may be provided with a second bus connector to receive a second end of the first link of the plurality of links 208. In one embodiment, the circular top section 216 of each first flange 210 and the second flange 212 may be integrated with a plurality of grooves. In one embodiment, the rectangular base section 214 may be configured to receive the main handle 120, and the plurality of grooves may be configured to receive the at least one pair of vertical sections 122 of the main handle 120.

As shown in FIG. 2C, the platform 106 may be provided with a plurality of protruded sections 220 integrated on at least one side of the platform 106. Further, the plurality of protruded sections 220, are configured to be coupled with the plurality of levers 114. In one embodiment, the plurality of protruded sections 220 may be provided to be coupled the plurality of frames 112 via the plurality of levers 114 to transmit motion to the platform 106 through the plurality of wheels 108.

Figure 2D:
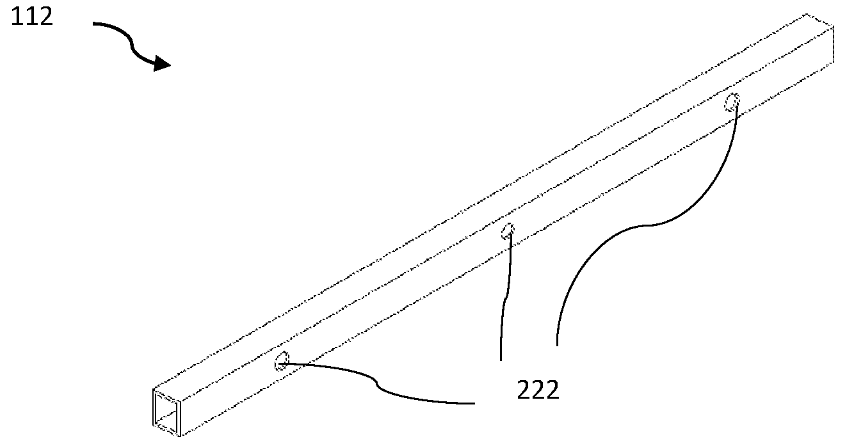
FIG. 2D illustrates a frame coupled to the platform, of the carpet pulling apparatus, according to a preferred embodiment of the invention.

Referring to FIG. 2D illustrates a frame of the plurality of frames 112 coupled to the platform 106, of the carpet pulling apparatus 100, in conjunction with FIG. 1A-1C, according to a preferred embodiment of the invention. The carpet pulling apparatus 100 may be provided with the plurality of frames 112 to be coupled with at least one side of the platform 106. In an embodiment, each frame of the plurality of frames 112 may be coupled to at least one side of the platform 106. Further, each frame may be provided with a second plurality of holes 222. Further, the second plurality of holes 222 may be integrated along a longitudinal direction of each of the plurality of frames 112. In an embodiment, the second plurality of holes 222 may be provided for receiving the plurality of shafts 116 to mount the plurality of wheels 108. In one exemplary embodiment, each frame may be provided with at least two holes to mount at least two shafts, and thereby at least two wheels. In another exemplary embodiment, each frame may be provided with at least one hole integrated at a middle section of the frame, which may be configured with the second end of at least one link. In one embodiment, each frame of the plurality of frames 112 may be a rectangular or square shaped hollow section or hollow pipe. In an embodiment, the plurality of frames 112 may be made from a material selected from a group of materials of alloy steel, stainless steel, or any material to withstand a load bearing capacity of the carpet pulling apparatus 100.

Figure 2E:
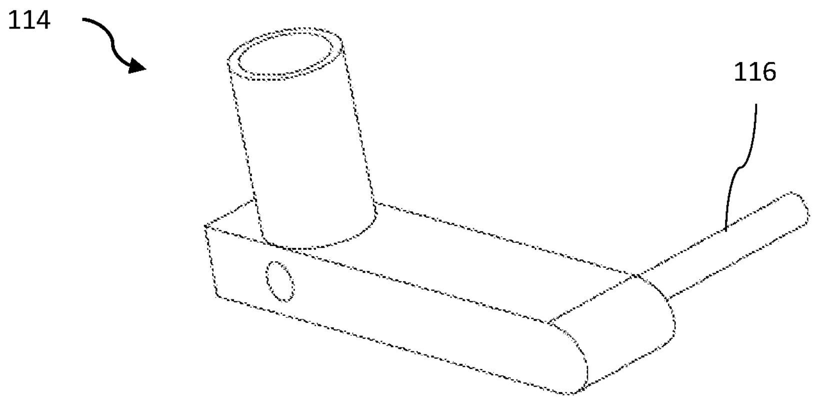
FIG. 2E illustrates a lever coupled to the platform, of the carpet pulling apparatus, according to a preferred embodiment of the invention.

Referring to FIG. 2E illustrates a lever of the plurality of levers 114 coupled to the platform 106, of the carpet pulling apparatus 100, in conjunction with FIG. 1A-C, according to a preferred embodiment of the invention. The plurality of levers 114 may be coupled to the plurality of frames 112, as mentioned above. Further, each lever of the plurality of levers 114 may be provided at one side with a shaft of the plurality of shafts 116. In one embodiment, the lever may act as a motion transmitter to the plurality of wheels 108, when the platform 106 may be moved from place to place. Further, one end of the lever may be coupled with the protruded sections 220 integrated on one side of the platform 106, and the other end may be coupled with a hole from the second plurality of holes 222 of the plurality of frames 112. In one embodiment, the lever may transmit motion from the trolley 104 to the plurality of wheels 108.

Figure 2F:
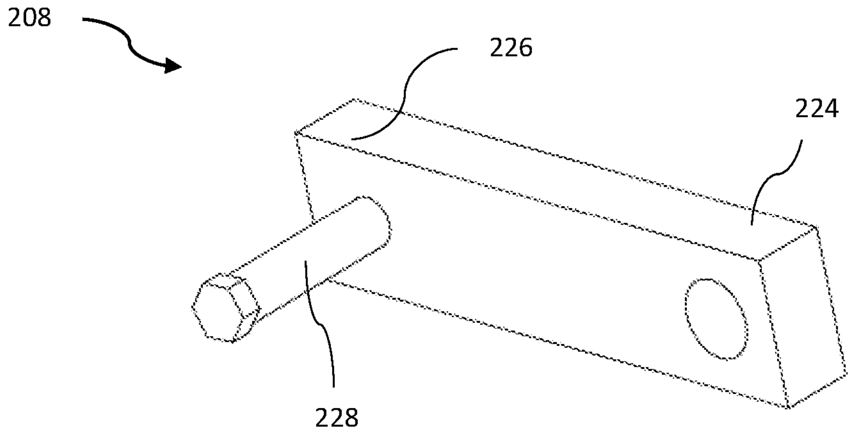
FIG. 2F illustrates a link coupled to the vertical flanges, of the carpet pulling apparatus, according to a preferred embodiment of the invention.

Referring to FIG. 2F illustrates a link of the plurality of links 208 coupled to the vertical flanges 110, of the carpet pulling apparatus 100, in conjunction with FIG. 1A-1C, according to a preferred embodiment of the invention. The link may be provided with a first end 224 and a second end 226. Further, the first end 224 may be coupled with the first flange 210 and the second flange 212 of at least one vertical flange 110. In one embodiment, the first bus connector 218 and the second bus connector of the first flange 210 and the second flange 212 may be configured to receive the first end 224 of the link. Further, the second end 226 of the link may be provided with a screw 228 extending from the second end 226 of the link. In one embodiment, the screw 228 of the second end 226 of the link may be coupled with at least one hole from the second plurality of holes 222 of the frame 112. In an exemplary embodiment, the first end 224 of the link may be coupled with the spring-controlled lever 118, and the second end 226 may be configured to be pushing the second plurality of slanted spikes of the bottom surface of the platform 106, for detaching the base plate 102.

Figure 2G:
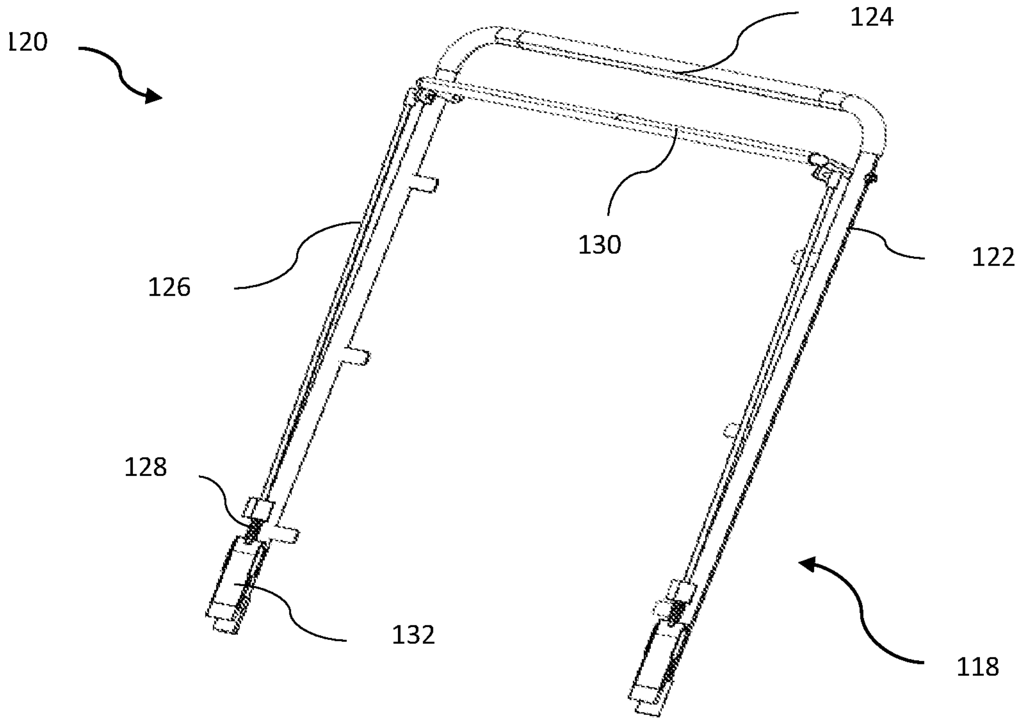
FIG. 2G illustrates a main handle coupled to the vertical flanges, of the carpet pulling apparatus, according to a preferred embodiment of the invention.

FIG. 2G illustrates the main handle 120 coupled to the vertical flanges 110, of the carpet pulling apparatus 100, in conjunction with FIG. 1A-C, and FIG. 2F according to a preferred embodiment of the invention. The main handle 120 as described earlier, may be detachably coupled to the trolley 104. Further, the main handle 120 may comprise the at least two vertical sections 122 and the at least one horizontal top section 124. In one embodiment, the at least two vertical sections 122 may be coupled with at least two vertical flanges 110. In another embodiment, the vertical sections 122 of the handle may be detachably coupled to the vertical flanges 110 using the spring-controlled level 118. Further, the spring-controlled lever may comprise the at least one cord 126 coupled to the at least one spring 128 at the one end; and coupled to the horizontal handle piece 130 at another end.

Further, the at least one spring 128 may be coupled to the at least one metal strip 132 at the other end. Further, the at least one metal strip 132 may be coupled to the first end 224 of the link at the lower end. In an exemplary embodiment, the horizontal handle 130 may be configured to be lifted upwards from the main handle 120, so that the cord 126 creates a tension in the at least one spring 128, and the spring tension pulls the at least one metal strip 132 upwards, which thereby pushes the first end 224 of the link downwards. Further, the downward motion of the first end 224 may lift the second end 226 of the link. Further, the second end 226 may push the second plurality of slanted spikes of the platform 106. Further, the second plurality of slanted spikes may lift the first plurality of slanted spikes of the base plate 102, and thereby facilitating detachment of the base plate 102 from the trolley.

Further, the spring-controlled lever 118 may be configured to detach the main handle 120 from the platform, by lifting the at least two vertical sections 122 of the main handle 120 from the plurality of grooves of the vertical flanges 110. In one embodiment, the main handle 120 may be attached or coupled with the first plurality of holes 204 of the base plate 102, after the base plate 102 may be detached from the platform 106.

Figure 3A:
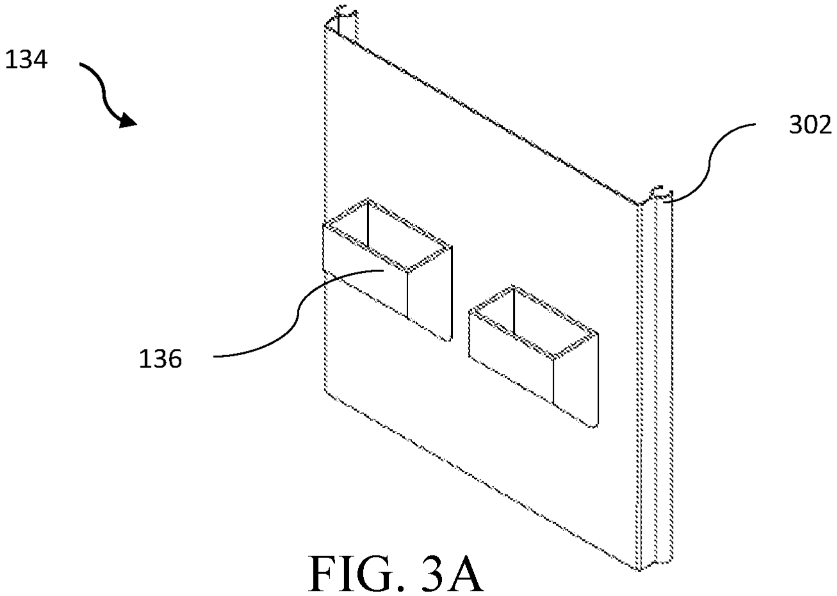
FIG. 3A illustrates a shield coupled to the main handle, of the carpet pulling apparatus, according to a preferred embodiment of the invention.

FIG. 3A illustrates the shield 134 coupled to the main handle 120, of the carpet pulling apparatus 100, in conjunction with FIG. 1A-C, according to a preferred embodiment of the invention. The carpet removing apparatus 100 may be provided with the shield 134 which may be coupled between the at least two vertical sections 122 of the main handle 120. Further, the shield 134 may be provided with at least two grooved channels 302 integrated on both sides of the shield 134. Further, the at least two grooved channels 302 may be coupled with the at least two vertical sections 122 of the main handle 120. In one embodiment, the shield 134 may be detachably coupled between the at least two vertical sections 122. Further, the carpet pulling apparatus 100 may further comprise at least one pocket 136 coupled to the shield 134.

In one embodiment, the carpet pulling apparatus 100 may comprise a plurality of pockets coupled to the shield 134. In one exemplary embodiment, at least one pocket 136 may be provided for storing a plurality of carpet pulling clamps 138 or carpet cutters or alike. Further, the shield 134 may further comprise a plurality of clamp holders 140. Further, the plurality of clamp holders 140 may be coupled at one side of the shield 134. In one embodiment, the plurality clamp holders 140 may be provided to hold the carpet pulling clamps 138 into the plurality of pockets 136. In one embodiment, the shield 134 may be provided for holding numerous components of the carpet pulling apparatus 100. In another embodiment, the shield may be provided for protecting a user during carpet removing. In one embodiment, the shield 134 may be a flat metal sheet coupled between the vertical sections 122 of the main handle 120. In one embodiment, the shield 134, the plurality of pockets or the at least one pocket 136 may be forged as single unit. In another embodiment, the shield 134, the plurality of pockets or the at least one pocket 136 may be forged separately. In one exemplary embodiment, the shield 134 may be made from a material selected from a group of materials of wood, steel, stainless steel, plastic, fiber and alike.

Figure 3B:
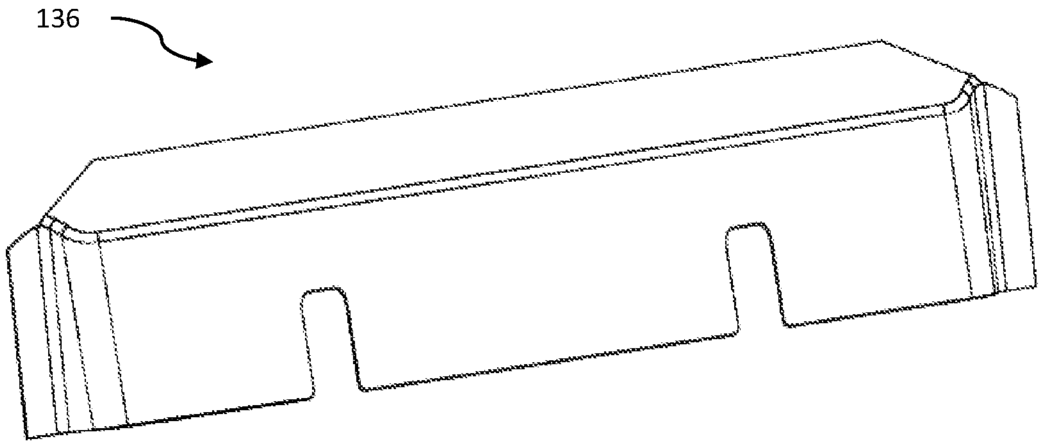
FIG. 3B illustrates a pocket coupled with the shield, of the carpet pulling apparatus, according to a preferred embodiment of the invention.

FIG. 3B illustrates the at least one pocket 136 pocket coupled with the shield 134, of the carpet pulling apparatus 100, in conjunction with FIG. 1A-C, according to a preferred embodiment of the invention. The shield 134 as stated above may be provided with at least one pocket 136 for storing the numerous components of the apparatus 100. Further, the at least one pocket 136 may be removably coupled to the shield using a multiple number of screws. In one embodiment, the pocket 136 may be a box shaped or cavity for storing components. In one embodiment, the shield 134 may be coupled with the plurality of pockets, for storing multiple components of different shape and size. In one exemplary embodiment, the at least one pocket 136 may be provided for storing the carpet pulling clamps 138 or carpet cutters or both.

Figure 3C:
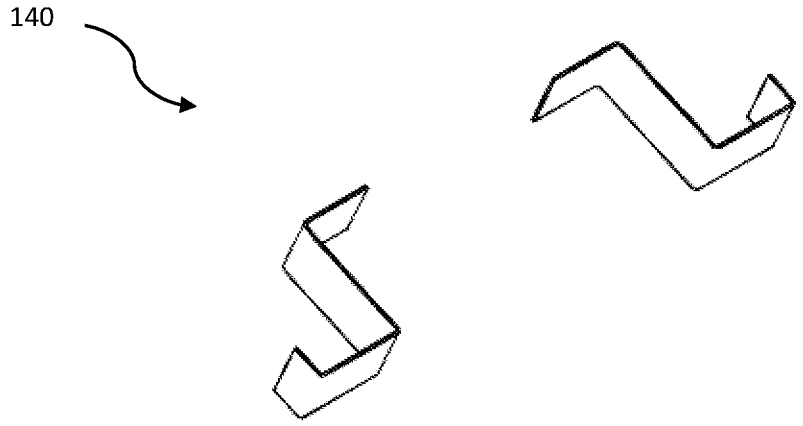
FIG. 3C illustrates a plurality of clamp holders coupled to the shield, of the carpet pulling apparatus, according to a preferred embodiment of the invention.

FIG. 3C illustrates the plurality of clamp holders 140 coupled to the shield 134, of the carpet pulling apparatus 100, in conjunction with FIG. 1A-C, according to a preferred embodiment of the invention. The plurality of clamp holders 140 may be coupled to the at least one side of the shield 134. In one embodiment, the plurality of clamp holders 140 may be coupled to the shield 134 above the at least one pocket 136. In another embodiment, each clamp holder of the plurality of clamp holders 140 may be an L-shaped metal or plastic strip coupled to the shield 134. Further, the L-shaped strip may be configured to hold at least one carpet pulling clamp 138 into the at least one pocket 136.

Figure 4:
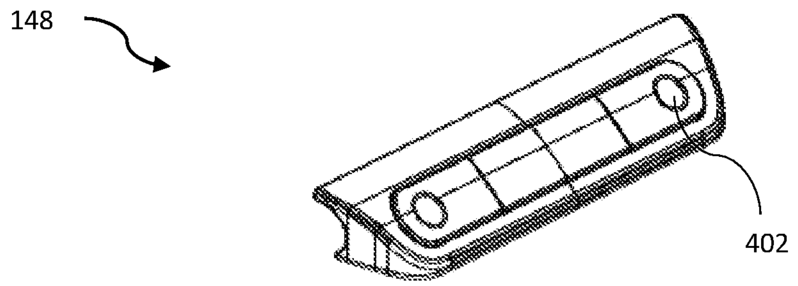
FIG. 4 illustrates a remote controller coupled to the handle, of the carpet pulling apparatus, according to a preferred embodiment of the invention.

FIG. 4 illustrates the remote controller 148 coupled to the main handle 120, of the carpet pulling apparatus 100, in conjunction with FIG. 1A-C, according to a preferred embodiment of the invention. The remote controller 148 may be coupled to the horizontal top section 124 of the main handle 120. In one embodiment, the remote controller 148 may comprise a plurality of push buttons 402. Further, the plurality of push buttons 402 may be configured to operate the remote-controlled winch 144. In one embodiment, each push button of the plurality of push buttons 402 may have a desired function of pulling the cable 146 with respect to the remote-controlled winch 144 and the base plate 102.

Figure 5A:
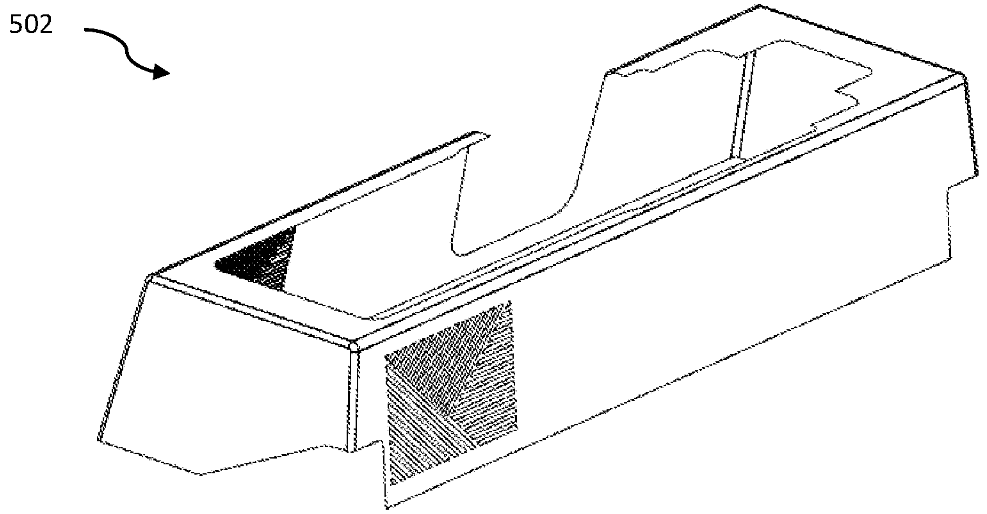
FIG. 5A illustrates a winch housing disposed over the platform, of the carpet pulling apparatus, according to a preferred embodiment of the invention.

FIG. 5A illustrates a winch housing 502 disposed over the platform 106, of the carpet pulling apparatus 100, in conjunction with FIG. 1A-C, according to a preferred embodiment of the invention. The winch housing 502 may be configured to hold or store the remote-controlled winch 144 along with the cable 146 coupled with the remote-controlled winch 144. In an embodiment, the winch housing 502 may coupled to the platform 106. In another embodiment, the winch housing 502 may be disposed over the top surface 206 of the platform 106. In one embodiment, the winch housing 502 may be made from a material selected from a group of materials of steel, alloy steel, plastic, wood, and alike.

Figure 5B:
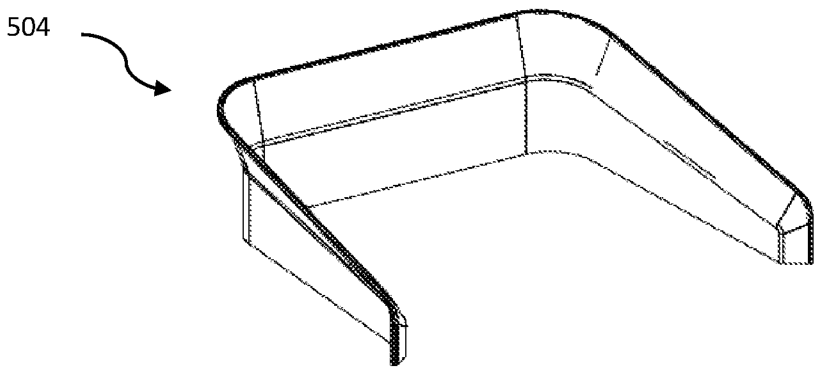
FIG. 5B illustrates a winch edge cover coupled to the winch housing, of the carpet pulling apparatus, according to a preferred embodiment of the invention.

FIG. 5B illustrates a winch edge cover 504 coupled to the winch housing 502, of the carpet pulling apparatus 100, according to a preferred embodiment of the invention. The winch edge cover 504 may be coupled to the winch housing 502 to protect the winch housing 502 edges from getting scratched or broken during operating the carpet removing apparatus 100. In one embodiment, the winch edge cover 503 may be a U-shaped sheet disposed around the winch housing 502.

Figure 6:
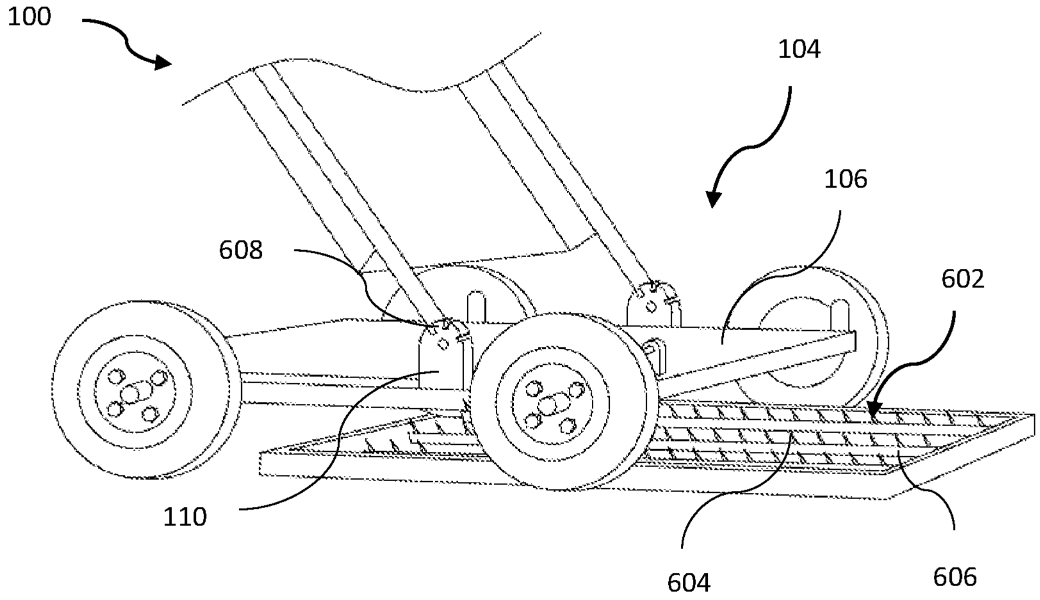
FIG. 6 illustrates a sectional view of the carpet pulling apparatus, with the base plate being detached from the platform, according to a preferred embodiment of the invention.

FIG. 6 illustrates a sectional view of the carpet pulling apparatus 100, with the base plate 102 being detached from the platform 106, in conjunction with FIG. 1A-1C, according to a preferred embodiment of the invention. The base plate 102 is provided with the first surface 202 with the first plurality of holes 204, and the second surface 602 with the first plurality of slanted spikes 604 arranged on the first plurality of strips 606. In one embodiment, the first plurality of slanted spikes 604 may be coupled with the second plurality of slanted spikes (not shown) of the platform 106. Further, the mechanism of disengaging or detaching the base plate 102 from the platform 106 is explained in greater detail above. Further, the vertical flanges 110 may further comprise the grooved sections 608 integrated on the circular top section 216 of the vertical flange 110. In one embodiment, the plurality of grooved sections 608 may be configured to couple with the at least two vertical sections 122 of the main handle 120.

FIG. 7 illustrates a system of carpet removal, wherein the carpet pulling apparatus 100 coupled with a carpet cutter 702, according to a preferred embodiment of the invention. The system of carpet removing refers carpet cutting system using carpet cutter and carpet pulling apparatus, and system of pulling the cut pieces of carpet by carpet pulling clamp and carpet pulling apparatus in accordance to the FIG. 7 to FIG. 8. As shown, the carpet pulling apparatus 100 may include the base plate 102, the trolley 104 with the platform 106, and the remote-controlled winch 144 having the cable 146. Further, the base plate 102 may be provided with the first plurality of clamping hooks 704. Further, at least one clamping hook may be configured to be coupled at least one pulley 706. In an embodiment, the cable 146 may extend from the first end 708 to the second end 710. Further, the first end 708 may be coupled with the remote-controlled winch 144 and the second end 710 may be coupled with the carpet cutter 702 via the pulley 706. In one embodiment, the base plate 102 may act as a diverter to divert the second end 710 from the first end 708 or the remote-controlled winch 144. Further, the second end 710 of the cable 146 may be coupled with the carpet cutter 702 using a second plurality of clamping hooks 712. The second plurality of clamping hooks 712 may be engaged with hole of the cutter mean for connection for second end of the cable extending from the winch. In one embodiment, the carpet cutter 702 may be placed at one end of a carpet, with the second end 710 of the cable 146 coupled to the carpet cutter 702. The remote controller 148 may be used to pull the second end 710 of the cable 146 towards the remote-controlled winch 144, and thereby to facilitate a cutting action of the carpet. In one embodiment, the carpet cutter 702 may be provided with a sharp edge or blade. Further, the blade may be disposed below the one end of the carpet, and the cable 146 may be pulled towards the remote-controlled winch 144, from second end 710 towards the first end 708 using the remote controller 148.

Further, as shown in FIG. 7, in one embodiment, at least two pullies may be coupled with the first plurality of clamping hooks 704 of the base plate 102, for receiving a plurality of cables from the remote-controlled winch 144. In on exemplary embodiment, a plurality of base plates may be provided to act as diverter pads for a plurality of carpet cutters.

Figure 8:
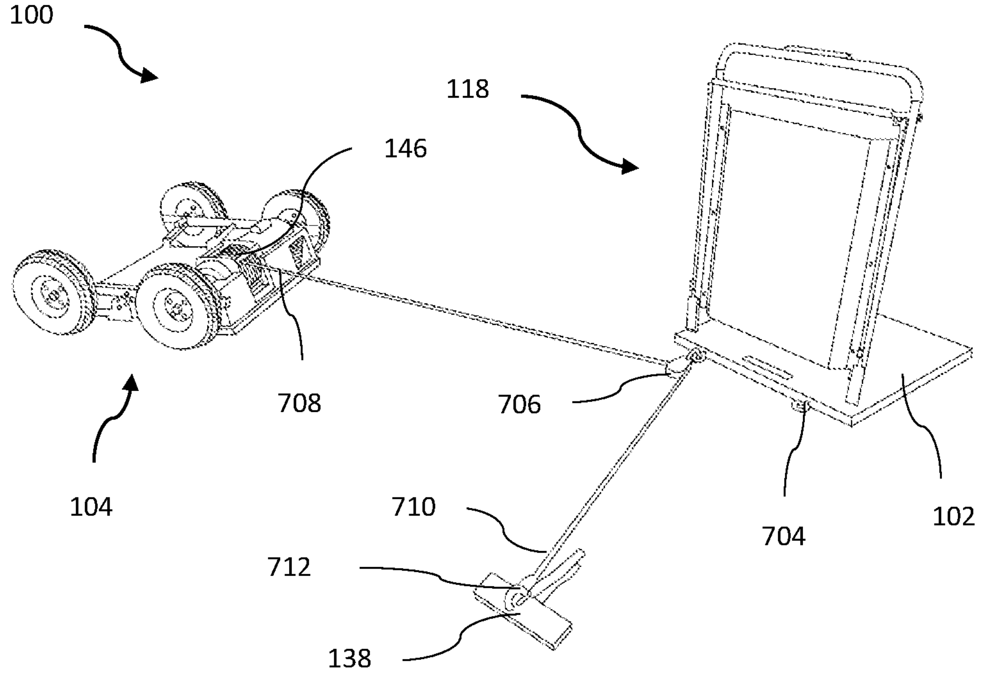
FIG. 8 illustrates a system of carpet removal showing the carpet pulling apparatus coupled with a carpet pulling clamp, according to a preferred embodiment of the invention.

FIG. 8 illustrates a system of carpet removal showing carpet pulling action comprises the carpet pulling apparatus 100 coupled with a carpet pulling clamp 138, in conjunction with FIG. 1A-C, and FIG. 7, according to a preferred embodiment of the invention. As mentioned above, the plurality of cables may be provided for employing a plurality of carpet pulling clamps. Further, the carpet pulling clamp 138 may be coupled with the second end 710 of the cable 146, and the pulley 706 may be configured to receive the second end 710 of the cable 146, with the first end 708 coupled with the remote-controlled winch 144. FIG. 7 and FIG. 8, illustrate, but not limited to, some exemplary embodiments of the carpet pulling apparatus 100. In one embodiment, the plurality of carpet pulling clamps, the plurality of carpet cutters, plurality of carpet removers, or alike may be used for removing carpet off the floor.

In one alternate exemplary embodiment, a carpet removing system is disclosed. The system may comprise a base plate having a first surface with a plurality of holes, a first plurality of clamping hooks, and a second surface with a plurality of first slanted spikes arranged in a plurality of first strips. The apparatus may further comprise a trolley is detachably coupled with the base plate. The trolley comprises a platform having a top surface and a bottom surface. The top surface is provided with at least one pair of vertical flanges disposed on either side of the platform. At least one pair of frames are detachably coupled with the top surface of the platform through a plurality of levers. At least one pair of links are coupled with the pair of vertical flanges at a first end, and with the pair of frames at a second end. The bottom surface having a plurality of second slanted spikes arranged on a plurality of second strips, and configured to receive the plurality of first slanted spikes. Further, the apparatus may comprise a plurality of wheels is coupled to the at least one pair of frames through the plurality of levers. A housing is disposed over the platform, to enclose a remote-controlled winch, and a cable extending from a first end to a second end, the first end being received by the remote-controlled winch. A main handle is provided and is having a pair of vertical sections, and at least one horizontal top section, and detachably coupled to the at least one pair of vertical flanges of the platform, through a spring-controlled lever coupled with the main handle. The main handle comprising a shield disposed within the at least one pair of vertical sections of the main handle, and a remote controller disposed over the at least one horizontal top section of the main handle. The spring-controlled lever is configured to be lifted upwards, and the main handle is inclined downwards along the at least one pair of vertical flanges, to detach the base plate from the platform, and the main handle is thereby lifted from the platform in order to attach with the first surface of the base plate.

Therefore, it will be apparent for an ordinary person skilled in the art, that from the description above stated, that the carpet pulling apparatus 100 may be used for a variety of applications, such as, but not limited to, the above-mentioned applications. Further, some applications in the field of removing carpets glued to floor, may be considered as a major aspect of the present carpet pulling apparatus 100 herein disclosed. The carpet pulling apparatus disclosed here has dual function of employing as diverter with handle and winch act as pulling mechanism.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A carpet pulling apparatus comprising:

a base plate with a first surface and a second surface, wherein the first surface comprises at least one pair of holes, and the second surface comprises a plurality of first slanted spikes arranged on a plurality of strips;

a trolley detachably coupled with the base plate, wherein the trolley comprises:

a platform having at least one pair of vertical flanges disposed on either side of the platform;

at least one pair of frames detachably coupled with the platform through a plurality of levers;

at least one pair of links coupled with the pair of vertical flanges at a first end, and with the pair of frames at a second end; and a plurality of wheels coupled to the at least one pair of frames through the plurality of levers;

a spring-controlled lever detachably mounted to a main handle at an upper end, and to the at least one pair of links at a lower end, wherein the spring-controlled lever is configured to detach the base plate from the platform;

a remote-controlled winch enclosed in a housing disposed over the platform, wherein the remote-controlled winch comprises a cable extending from a first end to a second end, the first end being received by the remote-controlled winch.

2. The carpet pulling apparatus as claimed in claim 1, wherein the platform comprises a top surface, and a bottom surface, the bottom surface being provided with a plurality of second slanted spikes facing the base plate.

3. The carpet pulling apparatus as claimed in claim 1, wherein the spring-controlled lever comprises:

at least two vertical cords coupled with each other through a horizontal handle, the horizontal handle being detachably mounted to the main handle; and at least two springs coupled to the at least two vertical cords at a first side, and to at least two metal strips at a second side, the at least two metal strips being coupled with the at least one pair of links, wherein the spring-controlled lever is configured to detach the base plate from the trolley by lifting the horizontal handle upwards, which pushes the plurality of second slanted spikes, facing the plurality of first slanted spikes, downwards through the at least one pair of links.

4. The carpet pulling apparatus as claimed in claim 3, wherein the spring-controlled lever is configured to lift the horizontal handle, and lean rearwards along the at least one pair of vertical flanges to detach the main handle from the vertical flanges of the platform.

5. The carpet pulling apparatus as claimed in claim 4, wherein the main handle is configured to be attached to the at least one pair of holes of the first surface of the base plate during carpet pulling.

6. The carpet pulling apparatus as claimed in claim 3, wherein the base plate is configured to be disposed over a carpet with the plurality of first slanted spikes embedding into a carpet.

7. The carpet pulling apparatus as claimed in claim 1, wherein the main handle comprises at least one pair of vertical sections, and at least one horizontal top section, the at least one pair of vertical sections are configured to mount a shield.

8. The carpet pulling apparatus as claimed in claim 7, wherein the shield comprises a main body having at least two grooved channels disposed on at least both sides of the main body;

a plurality of pockets coupled with the main body using a plurality of screws; and a plurality of holders coupled with the main body above each of the plurality of pockets, wherein the at least two grooved channels of the main body are configured to be coupled with the at least one pair of vertical sections of the main handle, wherein the plurality of pockets and the plurality of holders are configured to receive a plurality of carpet pulling clamps.

9. The carpet pulling apparatus as claimed in claim 1, wherein each vertical flange of the at least one pair of vertical flanges comprises:

a rectangular base section, and a circular top section, and disposed over at least first side end of the platform;

a first hole disposed on the circular top section to receive the first end of first link from the at least one pair of links; and a plurality of grooves integrated over the circular top section, wherein the rectangular base section is configured to receive the main handle, and the plurality of grooves are configured to receive the at least one pair of vertical sections of the main handle.

10. The carpet pulling apparatus as claimed in claim 1, further comprising a plurality of hooks disposed over at least one side surface of the base plate, each hook is configured to receive a pulley.

11. The carpet pulling apparatus as claimed in claim 10, wherein the remote-controlled winch is operated by a remote controller disposed over the main handle, and the remote-controlled winch is motorized to pull the first end of the cable by applying a pull force, and the second end of the cable moves rearwards along the pulley with respect to the base plate.

12. The carpet pulling apparatus as claimed in claim 1, wherein the base plate is configured to be detached from the platform to act as a diverter for directing the cable from the remote-controlled winch to a carpet cutting apparatus.

13. A carpet removing system, the system comprising:

a base plate comprising:

a first surface with a plurality of holes;

a first plurality of clamping hooks; and a second surface with a plurality of first slanted spikes arranged on a plurality of first strips;

a trolley detachably coupled with the base plate, wherein the trolley comprises:

a platform comprising:

a top surface with at least one pair of vertical flanges disposed on either side of the platform;

at least one pair of frames detachably coupled with the top surface of the platform through a plurality of levers;

at least one pair of links coupled with the pair of vertical flanges at a first end, and with the pair of frames at a second end; and a bottom surface having a plurality of second slanted spikes arranged on a plurality of second strips, and configured to receive the plurality of first slanted spikes;

a plurality of wheels coupled to the at least one pair of frames through the plurality of levers;

a housing disposed over the platform, wherein the housing encloses a remote-controlled winch;

a cable extending from a first end to a second end, the first end being received by the remote-controlled winch; and a main handle having a pair of vertical sections, and at least one horizontal top section, and detachably coupled to the at least one pair of vertical flanges of the platform, through a spring-controlled lever coupled with the main handle, wherein the main handle comprising:

a shield disposed within the at least one pair of vertical sections of the main handle; and a remote controller disposed over the at least one horizontal top section of the main handle, wherein the spring-controlled lever is configured to be lifted upwards, and the main handle is inclined downwards along the at least one pair of vertical flanges, to detach the base plate from the platform, and the main handle is thereby lifted from the platform in order to attach with the first surface of the base plate.

14. The carpet removing system as claimed in claim 13, wherein the spring-controlled lever comprises:

at least two vertical cords coupled with each other through a horizontal handle, the horizontal handle being detachably mounted to the main handle; and at least two springs coupled to the at least two vertical cords at a first side, and to at least two metal strips at a second side, the at least two metal strips being coupled with the at least one pair of links, wherein the spring-controlled lever is configured to detach the base plate from the trolley by lifting the horizontal handle upwards, which pushes the plurality of second slanted spikes, facing the plurality of first slanted spikes, downwards through the at least one pair of links.

15. The system as claimed in claim 14, wherein the plurality of second strips of the bottom surface is controlled by the movement of the spring-controlled lever.

16. The system as claimed in claim 14, wherein the plurality of first slanted spikes is arranged in a manner that, upon the downward movement of the main handle, the at least one pair of links, coupled with the plurality of second slanted spikes arranged on the second strips, push the plurality of first slanted spikes arranged on the first strips, forwards, to remove coupling of the first slanted spikes and the second slanted spikes.

17. The system as claimed in claim 14, wherein the plurality of first slanted spikes of the second surface of the base plate are configured to be disposed over the carpet.

18. The carpet pulling system as claimed in claim 13, wherein the remote controller comprises, a pair of push buttons, for forward operation and rearward operation of the cable received by the remote-controlled winch.

19. The carpet pulling system as claimed in claim 13, further comprising a pulley coupled with a clamping hook from the first plurality of clamping hooks of the base plate, and the cable extending from a first end to a second end engages with the pulley at a location between first end and the second end of the cable, wherein the pulley receives the second end of the cable.

20. The carpet pulling system as claimed in claim 13, further comprising a carpet cutting apparatus, detachably coupled to the second end of the cable.

21. The carpet pulling system as claimed in claim 13, wherein the base plate acts as a diverter for directing the cable from the remote-controlled winch to a carpet cutting apparatus or pulleys, the diverter is configured to receive the cable at a location between the first end, and the second end, and divert a direction of extension of the cable.

* * * * *